United States Patent [19]

Maves

[11] 4,079,860

[45] Mar. 21, 1978

[54] MANUALLY OPERATED CONTROLLED VOLUME DISPENSER FOR FREE-FLOWING PRODUCT

[76] Inventor: Charles William Maves, 23 Tarryton Dr., Victor, N.Y. 14564

[21] Appl. No.: 702,026

[22] Filed: Jul. 2, 1976

Related U.S. Application Data

[63] Continuation of Ser. No. 573,882, May 2, 1975, abandoned.

[51] Int. Cl.² ............................................. G01F 11/24
[52] U.S. Cl. ..................................... 222/48; 222/306; 308/237 R
[58] Field of Search ............... 222/305, 306, 350, 349, 222/368, 367, 48; 308/15, 237 R, 26

[56] References Cited

U.S. PATENT DOCUMENTS

| | | | |
|---|---|---|---|
| 1,269,451 | 6/1918 | Jackson | 222/306 |
| 2,820,577 | 1/1958 | Winters et al. | 222/306 |
| 3,204,833 | 9/1965 | Weitzner | 222/368 X |
| 3,451,705 | 6/1969 | Turpen | 308/15 X |
| 3,659,754 | 5/1972 | Barone et al. | 222/368 |
| 3,750,902 | 8/1973 | Starrett | 222/368 X |

*Primary Examiner*—Robert B. Reeves
*Assistant Examiner*—John P. Shannon
*Attorney, Agent, or Firm*—Millen & White

[57] ABSTRACT

A novel dispenser is provided for flowable material. The novel dispenser includes a novel dispensing hopper. The dispenser includes a container provided with an upper closure member, and a lower outlet aperture. Guideways associated with the lower outlet aperture are provided selectively to retain a second vessel (e.g. a coffee brewing vessel) into which a predetermined amount of flowable material (e.g. ground coffee) is to be dispensed. The novel dispensing hopper is disposed between the upper closure and the lower outlet aperture. The novel dispensing hopper includes a hopper having an open top and a discharge aperture. A cylindrical, manually rotatable valve member is detachably, rotatably mounted on the hopper adjacent to its discharge opening. A variable volume chamber, including structure to enable control of the volume, extends transversely of the valve member. The chamber, in one position, is aligned to the hopper discharge aperture, and in another position, is disposed in a dispensing position. The cylindrical valve is detachably retained within the containers by cooperation between an annular groove in the valve body and a spring-loaded stop member. In addition a substantially cylindrical open, retaining bushing is separately, detachably secured to the discharge aperture. The bushing includes a pair of transversely extending apertures aligned to the discharge aperture and a guiding passageway extends along the internal circumference of the bushing between the pair of transversely extending apertures. In this way an accurately premeasured amount of a bulk ingredient (e.g. ground coffee) may be dispensed accurately and efficiently, by means of a single structure which is easy to assemble, or to disassemble and clean.

17 Claims, 7 Drawing Figures

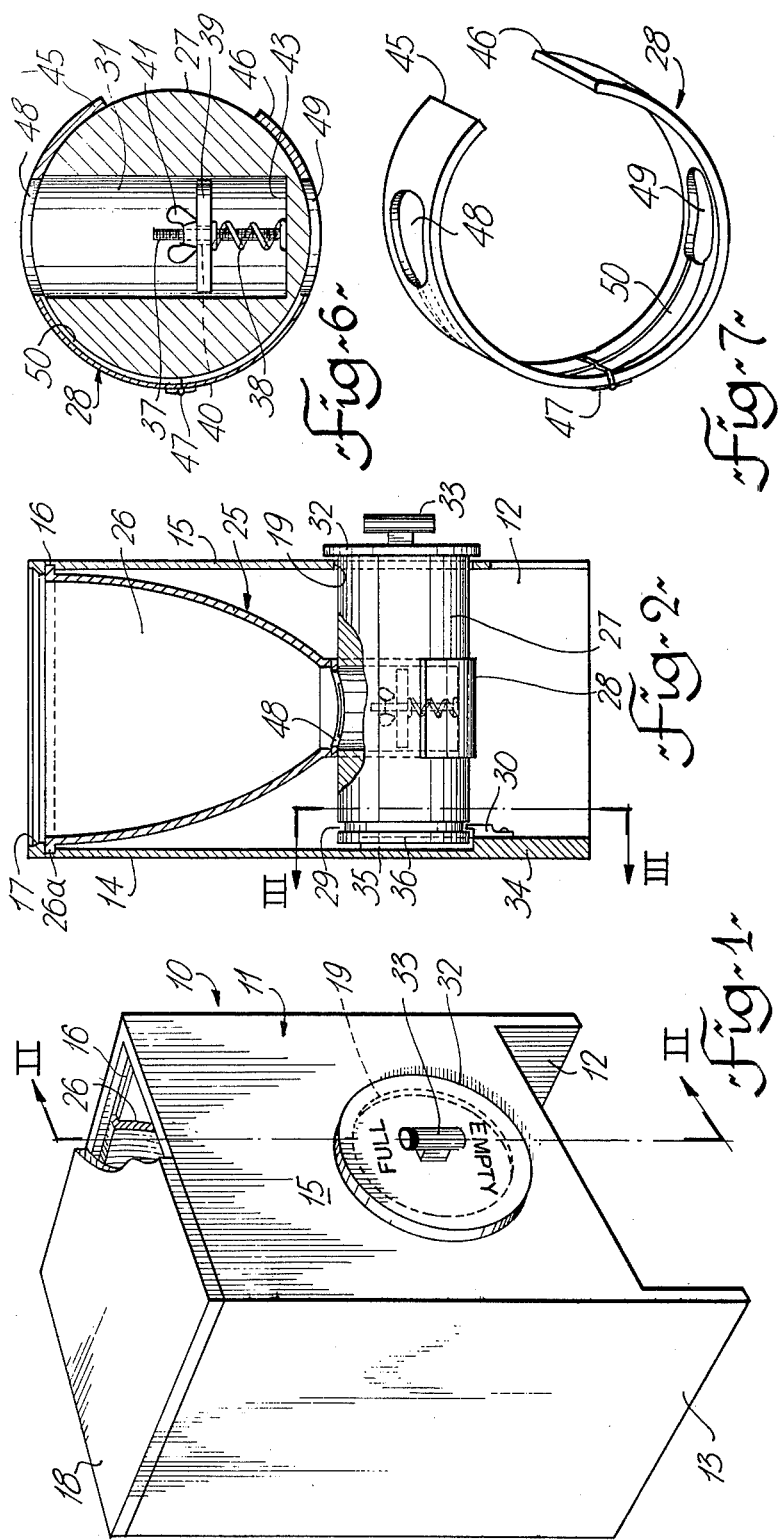

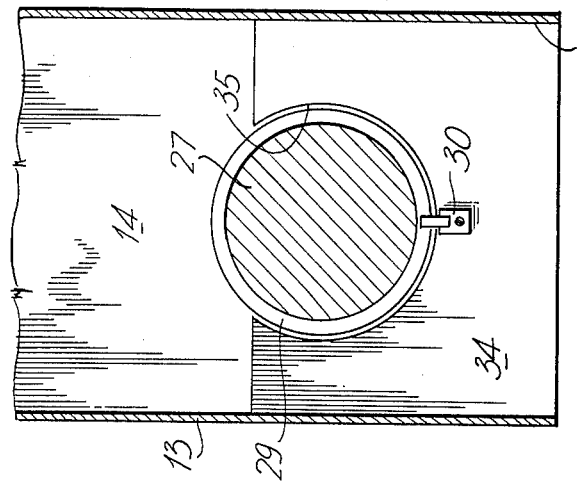
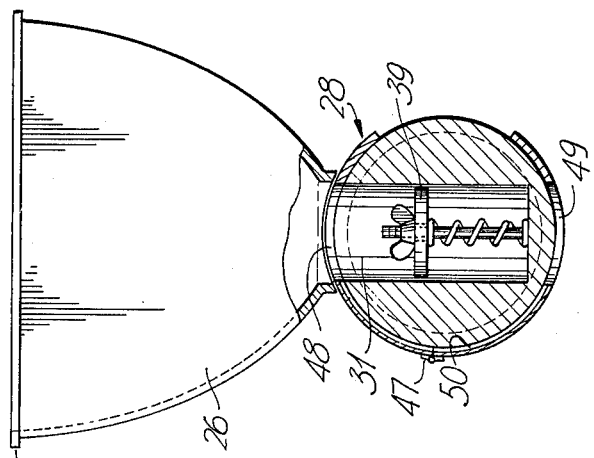
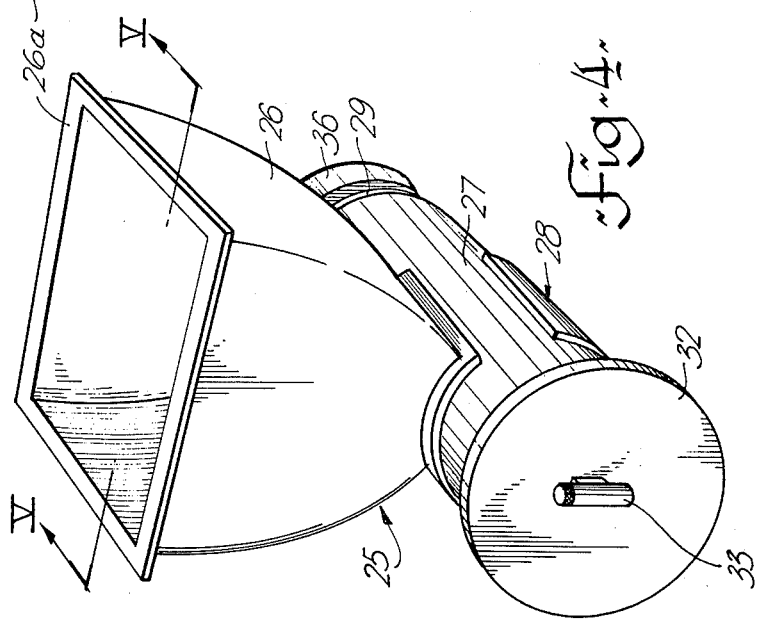

MANUALLY OPERATED CONTROLLED VOLUME DISPENSER FOR FREE-FLOWING PRODUCT

This application is a continuation of application Ser. No. 573,882 filed May 2, 1975, now abandoned.

BACKGROUND OF THE INVENTION

1. Field of the Invention

This invention relates to a manually operated dispenser. More particularly, it is directed to a manually operated dispenser for dispensing premeasured amounts, usually larger than unit dosage amounts, of a flowable product. Most especially, it is directed to the dispensing of smaller volume units of ground coffee from larger bulk volumes of ground coffee.

2. Description of the Prior Art

It is often desirable to dispense smaller amounts of flowable material, for example, ground coffee, powdered soaps, sugar, chlorine crystals, etc., from a larger amount of such flowable material. Many of the prior art devices include a container provided with an outlet port which is fitted with a movable valve mechanism. The movable valve mechanism is usually provided with a chamber therein. In one position the chamber communicates only with the outlet port. In another position, the chamber communicates only with a discharge opening to the smaller container. Nevertheless, in many instances the material being dispensed is crushed during its movement from the outlet port to the discharge opening. Furthermore, disassembling of the device for the purpose of cleaning is difficult. Moreover, the prior art structures are prone to becoming soiled, thereby requiring frequent such cleaning.

For example, Canadian Patent No. 135,880 issued Oct. 8, 1911 to W. B. Perick et al proposes to provide a dispenser whereby an exactly prescribed small unit dose of a drug may be dispensed. To this end, they provide two embodiments of dispensers. In a first one, dispensing apparatus is provided comprising a support and spaced arms carried thereby. The arms are provided with recessed portions. A hopper is removably supported by the arms and is provided with bosses fitting the recesses. A measuring device is removably mounted beneath the hopper. In the second embodiment, dispensing apparatus is provided comprising a support with a head thereon. The head has a recess therein. Arms are formed on the head and a hopper is embraced by the arms. A stud is carried by the hopper and extends into the recess of the head. A measuring device is movably mounted beneath the hopper.

Canadian Patent No. 179,204 issued Sept. 11, 1917 to W. A. Hill also proposed to provide a device for measuring out and regulating, from a mass of medicinal powders, the exact amount to furnish the desired unit dose. To this end, he provides an apparatus for measuring charges of powder, comprising the combination of a container for powder, the container having an outlet. A measuring conveyor is arranged to travel close to the container outlet, normally covering and closing the outlet and having a cavity or chamber to receive and measure the charges of powder when in line with the container outlet. Means are provided for driving the conveyor to carry charges from the powder container and deliver them at the required point. The driving means is adapted to place the conveyor in different stationary positions, in which first one side and then the other side of the measuring cavity partially uncovers the outlet. At the same time the cavity is only partially exposed to the outlet. In this way, the cavity is caused to become completely filled.

Canadian Patent No. 231,978 issued June 19, 1923 to George J. Corcoren provides a dispenser for discharging a definite amount of mixed nuts. The dispenser is alleged to be of simple and inexpensive construction which can be readily disassembled for the purpose of cleaning. It includes a vessel with a discharge neck. Secured to the discharge neck in a transverse direction is the upper half of a semi-cylindrical bushing. The lower half of the semi-cylindrical bushing is detachably secured to the upper half of the bushing. A cylindrical dispensing valve is secured between the upper and lower halves of the bushing. The dispensing valve is provided with a variable volume chamber, which communicates not only with the discharge neck when the valve is turned up, but also with a discharge opening when the valve is turned down. During the rotation of the valve, the mixed nuts could tend to become crushed, thereby tending to reduce their flavour.

Canadian Patent No. 523,712 issued Apr. 10, 1956 to Worswick provides an improved powder feed mechanism for molding presses including a drum adapted to be oscillated back and forth about its axis within a casing having powder feed and delivery branches thereon. The drum has a series of compartments disposed side by side and adapted, as the drum is oscillated, to be brought into line with the feed and delivery branches. The bottom of each compartment consists of a piston-like element adjustable along the compartment in order to regulate the volume or holding capacity of the compartment according to the quality of powder to be delivered by the compartment at each cycle of operations of the roller. A gap is provided in the casing surrounding the roller, and slots or grooves extend along the roller surface at positions which ensures that at least one groove comes into the gap at the end of each forward and of each backward movement of the roller, so that any powder which may get between the roller and casing will be caught in the slots or grooves and swept around within the casing until it is discharged in the gap. This arrangement is alleged to prevent powder accumulation between the roller and the casing and interferring with free movements of the roller. A spring-loaded adjusting screw is also provided which extends into each piston from the roller for moving each piston to adjust the volume of its compartment. Means are provided for preventing the piston from turning while the screw is being threaded. The adjusting screw may be operated from outside the casing.

Canadian Pat. No. 585,028 issued Oct. 13, 1959 to J. O. Winters et al provides a powder feed mechanism for dispensing accurately measured quantities of powder for a hopper. It includes a hopper having an open bottom, the top of the outlet member being in the form of upwardly extending arms at opposite edges thereof, with one of the arms being provided with a vertically extending recess. A horizontally disposed shaft is rotatably mounted between the arms with its periphery engaging the open bottom of the hopper to form a cutting edge. The shaft has a transversely extending cavity therethrough. Adjustable means are provided closing one end of the cavity. The cavity is aligned with the open bottom of the hopper, the recess in one of the arms and the outlet member during the rotation of the shaft. In this way powder is discharged from the hopper into the cavity and is dumped from the cavity into the outlet member.

Canadian Patent No. 644,607 issued July 10, 1962 to J. Giordano et al provides a dispensing valve having the ability to delivery measured quantities of material from a supply source. The valve includes a housing having an inlet and an outlet. A barrel valve sleeve is rotatably mounted within the housing for selective opening and closing the inlet and outlet respectively. A piston is telescopically mounted within the sleeve. Means are provided coacting between the piston and the housing for limiting the axial displacement of the piston to any of a plurality of preselected displacements. The volume of material to be dispensed through the barrel valve depends on the axial position of the piston. Means are provided coacting between the piston and the sleeve for rotating the sleeve.

SUMMARY OF THE INVENTION

While the above-mentioned dispensers may be used for dispensing unit quantities of material from a common source, they suffer the disadvantages either that they cannot dispense larger-than-one-unit dose quantity of material, or that they are too complicated in structure and hence are easily manufactured and/or dismountable. Moreover, the structure makes it difficult to clean the rotatable dispensing valve. Those that are of simple structure, however, may not feasibly be used for dispensing smaller quantities of ground coffee for restaurant use from bulk amounts of ground coffee, since the ground coffee tends to be compacted during the dispensing operation, thereby tending to inhibit satisfactory dispensing operation.

Accordingly, a main object of this invention is the provision of an improved dispenser for dispensing measured, but variable amounts, of flowable material from a larger amount of such flowable material.

By this invention, there is now provided, for use in a dispenser for flowable material: (a) a funnel, such funnel having a top opening and a bottom discharge chute; (b) a cylindrical rotatable valve member detachably rotatably secured to the discharge chute by means of an open C-shaped unitary resiliently deformable bushing, the bushing having a cylindrical cross-section and including upper and lower diametrically opposed apertures, the upper aperture being operatively associated with the bottom discharge, such bushing normally snugly embracing the valve member but being resiliently deformable out of its cylindrical cross-section, thereby to assist in the discharge flow of material; and (c) a variable volume chamber extending transversely of the valve member, such chamber including means to vary the volume thereof whereby the chamber, in one position, is aligned to the bottom discharge chute, and, in another position, is aligned to a second discharge opening.

By this invention there is also provided, for use in a dispenser for flowable material: (a) a funnel, such funnel having a top opening and a bottom discharge chute; (b) a cylindrical rotatable valve member, detachably, rotatably secured to the discharge chute by means of an open, C-shaped, unitary resiliently deformable bushing, said bushing being formed by two similar members resiliently hinged together and spring biased to a cylindrical cross-section and including upper and lower diametrically opposed apertures, including a guiding passageway extending along the internal circumference thereof between the upper and lower diametrically opposed apertures, the upper such aperture being operatively associated with the bottom discharge chute, and the bushing normally snugly embracing the valve member but the lower portion of the bushing being resiliently deformable out of its cylindrical cross-section thereby to assist in the discharge flow of material; and (c) a variable volume chamber extending transversely of the valve member, the chamber including means for varying the volume thereof, whereby such chamber, in one position, is aligned to the bottom discharge chute, and, in another position, is aligned to a second discharge opening.

By this invention in a tertiary feature thereof, a dispenser is provided for flowable material comprising: (I) a hopper having front, rear and side walls, a top and a discharge aperture; (II) a horizontally positioned cylindrical well in the rear wall of the hopper; (III) a retaining member disposed adjacent said cylindrical well; (IV) a funnel, disposed within the hopper, the funnel having a top opening adjacent the top of the hopper and a bottom discharge chute; (V) a cylindrical rotatably valve member having an inner cylindrical end and an outer cylindrical end, detachably, rotatably secured to the discharge chute by means of an open, C-shaped, unitary resiliently deformable bushing, the bushing having an upper end and a lower end and being formed of two members united together, the two members being spring biased to a cylindrical cross-section and including upper and lower diametrically opposed apertures, the upper such aperture being operatively associated with the bottom discharge chute, the bushing being provided with a guiding passageway extending along the internal circumference thereof between the upper and lower diametrically opposed apertures, and the bushing normally snugly embracing the valve member, but the lower portion thereof being resiliently deformable out of its cylindrical cross-section, thereby to assist in discharge flow of material, the valve member including a circumferential slot, spaced from the inner cylindrical end, the slot being selectively engageable by the retaining member, thereby to maintain the rotatable valve member in its mounted position to provide a dispenser for flowable material; and (VI) a variable volume chamber extending transversely of the valve member, the chamber including means for varying the volume thereof, whereby the chamber, in one position, is aligned to the bottom discharge chute of the funnel, and, in another position, is aligned to a second discharge opening adjacent the discharge aperture of the hopper.

By a first variant, of the primary feature of the invention, the upper end of the bushing surrounding the upper aperture is secured to the bottom discharge chute.

By another variant, of the primary feature of the invention, the bushing is formed of two members united together, the two members being spring biased to a cylindrical cross-section, the lower portion of the united two member bushing being resiliently deformable out of the cylindrical cross-section, thereby to assist in discharge flow of material.

By yet another variant, of the primary feature of the invention, the bushing includes a guiding passageway extending along the internal circumference thereof between the upper and lower diametrically opposed apertures.

By a variant of the secondary feature of the invention, the variable volume chamber is a closed ended, cylindrical well.

By another variant of the secondary feature of the invention, the means for varying the volume is provided by a manually vertically movable circular floor.

By yet another variant of the secondary feature of the invention, the circular floor is movably resiliently impaled on an upstanding threaded post, the upward action of the resilient member being restrained by a nut which is threaded on the upstanding post.

By a variant of the tertiary feature of the invention, the upper end of the bushing surrounding the upper aperture is secured to the bottom discharge chute.

By another variant of the tertiary feature of the invention, the outer cylindrical end of the valve member includes an enlarged diameter face plate to abut a circular opening in the front wall of the hopper.

By yet another variant of the tertiary feature of the invention, the dispenser includes a handle for manually turning the cylindrical rotatable valve member, and visible indicia for designating a "full" and an "empty" disposition of the variable volume chamber.

By a further variant of the tertiary feature of the invention, the dispenser includes means operatively associated with the dishcarge aperture of the hopper and disposed below the discharge chute selectively to retain a second vessel into which a predetermined amount of flowable material is to be dispensed, the flowable material being ground coffee, the second vessel comprising a container by means of which the coffee is brewed.

By yet a further variant of the tertiary feature of the invention, the dispenser includes a cover for closing the hopper in a substantially air-tight manner.

By a still further variant of the tertiary feature of the invention, the hopper, the funnel and the cylindrical valve member are formed of synthetic plastics material.

BRIEF DESCRIPTION OF THE DRAWINGS

In the accompanying drawings,

FIG. 1 is a perspective view of a dispenser according to this invention;

FIG. 2 is a transverse section along the line II—II of FIG. 1;

FIG. 3 is a longitudinal section along the line III—III of FIG. 1;

FIG. 4 is a perspective view of a dispensing hopper of this invention, which may be used on the dispenser of this invention;

FIG. 5 is a transverse section along the line V—V of FIG. 4;

FIG. 6 is a transverse section through the manually rotatable cylindrical valve used in this invention; and FIG. 7 is a perspective view of one embodiment of the cylindrical bushing used in this invention.

DESCRIPTION OF ONE PREFERRED EMBODIMENT

As seen in FIG. 1, the dispenser 10 includes a casing 11, generally in the form of a rectangular parallelepiped including side walls 12, 13, back wall 14 and front wall 15. The upper periphery of walls 12, 13, 14, 15 is provided with a substantially continuous rabetted slot 16, whose purpose will be described hereinafter. The upper rim of walls 12, 13, 14, 15 is provided with a substantially continuous ledge 17 to accommodate cover lid 18. The lower portion of wall 15 is cut away to provide access to the discharge opening of the dispensing hopper as will be described hereinafter. Means (not shown) may also be provided to hold, temporarily, a smaller container into which the flowable material is to be discharged.

The front wall 15 is also provided with a central aperture 19, shown in broken lines for the purpose of accommodating a manually rotatable valve, as will be further described hereinafter.

As seen in FIG. 4, the discharge hopper 25 includes a generally frusto-conical hopper 26 provided at its upper peripheral edge with a generally rectangular flat rim 26A, which is adapted to be disposed within slot 16 to hold the hopper 26 within the casing 11. The lower end of hopper 26 is provided with a discharge opening. Disposed across the opening is a cylindrical, manually rotatable valve including a body 27, held in place both by a split ring open, retaining bushing 28, and cooperation between a circumferential slot 29 in the wall of the cylindrical valve 27 and a spring stop member 30 (see FIGS. 2 and 3). The body 27 of the cylindrical valve is provided with a variable volume chamber 31 (see FIG. 2 and 6) which will be described later. The front face of the body 27 of the cylindrical valve is provided with a larger diameter retaining face plate 32, on which is mounted a turning handle 33.

As seen in FIGS. 2 and 3, the end wall 14 is provided with a lower thickened sub-wall 34 out of which is removed a generally horizontal, cylindrical well 35, designed to accommodate inner cylindrical end 36 of a cylindrical valve 27. Secured to sub-wall 34 at the lower portion thereof is a spring stop member 30, adapted selectively to engage circumferential slot 29 in the body 27 of the cylindrical valve, to retain the valve in the assembly aligned to aperture 24 (see FIG. 5).

As seen in FIGS. 2 and 6, the variable volume chamber 31 in the body 27 of the cylindrical valve comprises a cylindrical closed ended bore 43, in which is fitted an upstanding threaded bolt 37, with a coil spring 38 coaxially disposed thereon, and a circular plate 39, having a central aperture 40 therein fitted over the bolt 37. A wing nut 41 can control the volume of the chamber 31 by lowering, or allowing to raise, the plate 39.

The retaining and guiding bushing 28 is preferably in the form of a split ring having two incomplete semi-cylindrical halves 45, 46 held together by a spring hinge 47. Half 45 is provided with upper aperture 48, while lower half 46 is provided with lower aperture 49. An inset passageway 50 extends within the inside circumferential wall of halves 45, 46 between upper aperture 48 and lower aperture 49.

OPERATION OF ONE PREFERRED EMBODIMENT

In use, to dispense premeasured quantities of ground coffee, for example, a large quantity, for example 5 lbs. of ground coffee, is placed in the hopper 26. A conventional funnel used in a coffee-making machine is secured below the discharge outlet and held in place. The volume of chamber 31 had previously been adjusted for the proper and desired strength of coffee, e.g. 4 oz. The valve is turned so that the marked part of the handle 33 is up, i.e. directed towards a "full indicia". Then the handle is turned counterclockwise (as viewed in FIG. 1). The ground coffee in the chamber 31 is guided, in uncon pacted fashion by means of inset passageway 50 to be dumped through lower aperture 49 into the conventional funnel when the marked handle is at an "empty indicia". Continued rotation in the counterclockwise direction or in a clockwise direction returns the valve to the "fill position."

It will be seen, therefore, that in one embodiment, the dispenser consists of a funnel-shaped hopper feeding into a cylindrical cartridge or valve, which has an adjustable chamber into which material falls. The cylinder is rotated to fill with any flowable material, e.g. powdered or granulated material. The cylinder is then turned 180° to dump the predetermined amount of material into a container below the unit. The entire unit is encased, preferably in a plastic housing. However, the entire dispenser may be made of plastic or metal with the exception of the tension spring under the platform contained in the cylinder.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. For use in a dispenser for flowable material;
   a. a funnel, said funnel having a top opening and a bottom discharge chute;
   b. a cylindrical rotatable valve member, detachably, rotatably secured to said discharge chute by means of an open, C-shaped, unitary resiliently deformable bushing, said bushing having a cylindrical cross-section and including upper and lower diametrically opposed aperatures, the upper said aperature being operatively associated with said bottom discharge chute, and said bushing normally snugly embracing said valve member but being resiliently deformable out of its cylindrical cross-section, thereby to assist in the discharge flow of material, and
   c. a variable volume chamber extending transversely of said valve member, said chamber including means to vary the volume thereof, whereby said chamber, in one position, is aligned to said bottom discharge chute, and in another position is aligned to a second discharge opening.

2. The combination of claim 1 wherein the upper end of said bushing surrounding said upper aperature is secured to said bottom discharge chute.

3. The combination of claim 2 wherein said bushing is formed of two members united together, the two members being spring biased to a cylindrical cross-section, and wherein the lower portion of said united, two-member bushing is resiliently deformable out of said cylindrical cross-section, thereby to assist in discharge flow of material.

4. The combination of claim 1 wherein said bushing includes a guiding passageway extending along the internal circumference thereof between said upper and lower diametrically opposed aperatures.

5. The combination of claim 2 wherein said bushing includes a guiding passageway extending along the internal circumference thereof between said upper and lower diametrically opposed aperatures.

6. The combination of claim 3 wherein said bushing includes a guiding passageway extending along the internal circumference thereof between said upper and lower diametrically opposed aperatures.

7. For use in a dispenser for flowable material:
   a. a funnel, said funnel having a top opening and a bottom discharge chute;
   b. a cylindrical rotatable valve member, detachably, rotatably secured to said discharge chute by means of an open, C-shaped, unitary resiliently deformable bushing, said bushing being formed by two similar members resiliently hinged together and spring biased to a cylindrical cross-section and including upper and lower diametrically opposed apertures, including a guiding passageway extending along the internal circumference thereof between said upper and lower diametrically opposed apertures, the upper said aperture being operatively associated with said bottom discharge chute, and said bushing normally snugly embracing said valve member but the lower portion of said bushing being resiliently deformable out of its cylindrical cross-section thereby to assist in the discharge flow of material; and
   c. a variable volume chamber extending transversely of said valve member, said chamber including means for varying the volume thereof whereby said chamber in one position is aligned to said bottom discharge chute and in another position is aligned to a second discharge opening.

8. The combination of claim 7, wherein said variable volume chamber is a closed ended, cylindrical well.

9. The combination of claim 8, wherein said means for varying the volume is provided by a manually vertically movable circular floor.

10. The combination of claim 9, wherein said circular floor is movably resiliently impaled on an upstanding threaded post, a resilient member urging said circular floor upwardly, the upward action of the resilient member being restrained by a nut which is threaded on said upstanding post.

11. A dispenser for flowable material comprising:
   I. a hopper having front, rear and side walls, a top and a discharge aperture;
   II. a horizontally positioned cylindrical well in the rear wall of the hopper;
   III. a retaining member disposed adjacent said cylindrical well;
   IV. a funnel, disposed within said hopper, said funnel having a top opening adjacent the top of said hopper and a bottom discharge chute;
   V. a cylindrical rotatable valve member having an inner cylindrical end and an outer cylindrical end, detachably, rotatably secured to said discharge chute by means of an open, C-shaped, unitary resiliently deformable bushing, said bushing having an upper end and a lower end, and being formed of two members united together, the two members being spring biased to a cylindrical cross-section and including upper and lower diametrically opposed apertures, the upper said aperture being operatively associated with said bottom discharge chute, said bushing being provided with a guiding passageway extending along the internal circumference thereof between said upper and lower diametrically opposed apertures and said bushing normally snugly embracing said valve member but the lower portion thereof being resiliently deformable out of its cylindrical cross-section, thereby to assist in discharge flow of material, said valve member including a circumferential slot, spaced from said inner cylindrical end, said slot being selectively engageable by said retaining member, thereby to maintain said rotatable valve member in its mounted position to provide a dispenser for flowable material; and VI. a variable volume chamber extending transversely of said valve member, said chamber including means for varying the volume thereof, whereby said chamber, in one position, is aligned to said bottom discharge chute of said funnel and in another position is aligned to a second discharge opening adjacent said discharge aperture of said hopper.

12. The dispenser of claim 11 wherein said upper end of said bushing surrounding said upper aperture is secured to said bottom discharge chute.

13. The dispenser of claim 12, wherein said outer cylindrical end of said rotatable valve member includes an enlarged diameter face plate to abut a circular opening in the front wall of said hopper.

14. The dispenser of claim 12, including a handle for manually turning said cylindrical rotatable valve member, and visible indicia for designating a "full" and an "empty" disposition of said variable volume chamber.

15. The dispenser of claim 12, including means operatively associated with the discharge aperture of said hopper and disposed below said discharge chute selectively to retain a second vessel into which a predetermined amount of flowable material is to be dispensed, wherein said flowable material is ground coffee, and wherein said second vessel comprises a container by means of which said coffee is brewed.

16. The dispenser of claim 12 including a cover for closing said hopper in a substantially air-tight manner.

17. The dispenser of claim 12 wherein said hopper, said funnel and said cylindrical valve member are formed of synthetic plastics material.

* * * * *